(12) United States Patent
Babacan et al.

(10) Patent No.: US 9,715,098 B2
(45) Date of Patent: Jul. 25, 2017

(54) SPARSE DECONVOLUTION SPATIAL LIGHT MICROSCOPY IN TWO AND THREE DIMENSIONS

(71) Applicant: The Board of Trustees of the University of Illinois, Urbana, IL (US)

(72) Inventors: S. Derin Babacan, Champaign, IL (US); Mustafa A. H. Mir, Urbana, IL (US); Gabriel Popescu, Champaign, IL (US); Zhuo Wang, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 86 days.

(21) Appl. No.: 13/775,887

(22) Filed: Feb. 25, 2013

(65) Prior Publication Data

US 2013/0321908 A1    Dec. 5, 2013

Related U.S. Application Data

(60) Provisional application No. 61/653,460, filed on May 31, 2012.

(51) Int. Cl.
G02B 21/36     (2006.01)
G02B 21/00     (2006.01)
G02B 21/14     (2006.01)

(52) U.S. Cl.
CPC ......... *G02B 21/361* (2013.01); *G02B 21/008* (2013.01); *G02B 21/14* (2013.01); *G02B 21/365* (2013.01)

(58) Field of Classification Search
CPC ........ G02B 21/06; G02B 21/14; G02B 21/24; G02B 21/008; G02B 21/361;
(Continued)

(56) References Cited

U.S. PATENT DOCUMENTS

2009/0290156 A1    11/2009    Popescu et al. .............. 356/338

OTHER PUBLICATIONS

Babacan el al "Cell imaging beyond the diffraction limit using sparse deconvolution spatial light interference microscopy", Biomedical Optics Express, vol. 2, No. 7; Jul. 1, 2011, p. 1815-1827.*
(Continued)

*Primary Examiner* — Jie Lei
(74) *Attorney, Agent, or Firm* — Sunstein Kann Murphy & Timbers LLP (57) ABSTRACT

Methods and a computer program product for applying deconvolution to spatial light interference microscopy for resolution enhancement with respect to the diffraction limit in two and three dimensions. By exploiting the sparsity properties of the phase images, which is prominent in many biological imaging applications, and modeling of the image formation via complex fields, the very fine structures can be recovered which were blurred by the optics. The resolution improvement leads to higher accuracy in monitoring dynamic activity over time. Experiments with primary brain cells, i.e. neurons and glial cells, reveal new subdiffraction structures and motions. This new information can be used for studying vesicle transport in neurons, which may shed light on dynamic cell functioning. Finally, the method may flexibly incorporate a wide range of image models for different applications and can be utilized for all imaging modalities acquiring complex field images.

11 Claims, 5 Drawing Sheets

(58) Field of Classification Search
CPC .. G02B 21/365; G02F 2203/50; G01N 21/53; G01B 9/02; G01J 3/453
USPC ........ 359/279, 368, 370, 385; 356/338, 450, 356/456
See application file for complete search history.

(56) References Cited

OTHER PUBLICATIONS

Cotte et al., "Microscopy image resolution improvement by deconvolution of complex fields," *Opt. Exp.*, vol. 18, No. 19, pp. 19462-19478 (Sep. 2010).

Ding et al., "Instantaneous spatial light interference microscopy," *Opt. Exp.*, vol. 18, No. 2, pp. 1569-1575 (Jan. 2010).

Gazit et al., "Super-resolution and reconstruction of sparse sub-wavelength images," *Opt. Exp.*, vol. 17, No. 26, pp. 23920-23946 (Dec. 2009).

Haldar et al., "Label-Free High-Resolution Imaging of Live Cells With Deconvolved Spatial Light Interference Microscopy," *32$^{nd}$ Ann. Int. Conf of the IEEE Eng. in Medicine and Biology Society*, Buenos Aires, Argentina, pp. 3382-3385 (Aug. 31-Sep. 4, 2010).

McNally et al., "Three-Dimensional Imaging by Deconvolution by Microscopy," *Methods*, vol. 19, No. 3, pp. 373-385 (Nov. 1999).

Sarder et al., "Deconvolution Methods for 3-D Fluorescence Microscopy Images," *IEEE Signal Processing Magazine*, pp. 32-45 (May 2006).

Wang et al., "Spatial light interference microscopy (SLIM)," *Opt. Exp.*, vol. 19, No. 2, pp. 1016-1026 (Jan. 2011).

\* cited by examiner

SPARSE DECONVOLUTION SPATIAL LIGHT MICROSCOPY IN TWO AND THREE DIMENSIONS

The present application claims priority from U.S. Provisional Application Ser. No. 61/653,460, filed May 31, 2012, which is hereby incorporated by reference herein.

This invention was made with Government support under Grant Nos. CBET-0939511, CBET 08-46660 CAREER, CBET-1040462 MRI, 082265 (Physics Frontiers Center: Center for the Physics of Living Cells), and CCF-0916953, all awarded by the National Science Foundation, and under Grant No. R21 CA147967-01, awarded by the National Cancer Institute, and Grant R01GM082837 awarded by the National Institutes of Health. The Government has certain rights in the invention.

TECHNICAL FIELD OF THE INVENTION

The present invention pertains to methods for three-dimensional imaging, and, more particularly, for imaging at a resolution greater than the diffraction limit.

BACKGROUND OF THE INVENTION

Classical light microscopy techniques cannot be used directly in imaging most biological structures, as such structures are typically transparent, which is to say that they do not significantly absorb or scatter light, as discussed, for example, by Stevens et al., *Light microscopy techniques for live cell imaging, Science,* 300, pp. 82-86 (2003), incorporated herein by reference. More particularly, transparency has rendered tomographic imaging of live cells particularly challenging. Therefore this type of imaging has been implemented largely using fluorescence techniques. While confocal fluorescence imaging is a common approach to achieve sectioning, it requires fluorescence probes that are often harmful to a living specimen.

Since it has become increasingly clear that true understanding of cellular function requires high-resolution imaging in three dimensions, various fluorescence techniques have been adapted to work in 3D. Confocal microscopy is the most commonly used technique for 3D imaging and provides an axial resolution of approximately 500 nm. 4Pi microscopy, described by Hell et al., *Fundamental Improvement of Resolution with a 4pi-Confocal Fluorescence Microscope using 2-Photon Excitation, Opt. Comm.,* 93, pp. 277-82 (1992) yields an axial resolution of 90 nm, while, more recently, 3D-STORM (Stochastic Optical Reconstruction Microscopy) provides 50-60 nm resolution. Another approach for 3D re-construction is deconvolution microscopy, in which the blurring of the fluorescence image due to diffraction is treated as a linear problem and reversed numerically. In all of the forgoing methods, only the amplitude (intensity) of the field is measured.

Interference-based methods such as phase-contrast and differential-interference-contrast microscopy, allow imaging such transparent structures without the need for staining or tagging. More advanced methods have introduced the ability to associate quantitative information with a transparent specimen by precisely quantifying optical phase shifts induced by its structure and motion. Spatial light interference microscopy (SLIM), described in US Published Application 2009/0290156 (Popescu et al.), and by Wang et al., *Spatial light interference microscopy (SLIM), Opt. Exp.,* 19, pp. 1016-26 (2011), hereinafter, "Wang (2011a)," both incorporated herein by reference, provide high phase sensitivity imaging of nanoscale structures. SLIM has the important advantage of utilizing illumination characterized by a short-coherence length, and may be implemented via add-on modules added onto existing phase-contrast microscopes.

Depth-sectioning capabilities of SLIM, denominated spatial light interference tomography (SLIT), have been described in Wang et al., *Spatial light interference tomography (SLIT), Opt. Exp.,* 19, pp. 19907-18 (2011), hereinafter, "Wang (2011b)," incorporated herein by reference.

Interference-based microscopy is afflicted by optical degradation and noise, both introduced by the instrument. These degradations can be removed to a certain extent by employing post-processing methods. Deconvolution has been applied as a post-processing method to invert the optical transfer function of the instrument in intensity-based microscopy, as described, for example, by McNally et al., *Three-dimensional imaging by deconvolution microscopy, Methods,* 19, pp. 373-85 (1999), incorporated herein by reference. Deconvolution works by inverting the optical transfer function of the imaging instrument.

In the case of complex field microscopy, Cotte et al., *Microscopy image resolution improvement by deconvolution of complex fields, Opt. Exp.,* 18, pp. 19462-78 (2010), hereinafter, "Cotte (2010)," which is incorporated herein by reference, investigated the use of complex field deconvolution through inverse filtering in laser-based digital holographic microscopy and reported that the noise amplification, commonly encountered with inverse filtering in intensity-imaging, is not as significant in the case of complex field microscopy. However, due to the laser light illumination, the noise in the images limits the performance of the deconvolution and the overall resolution gain.

A nonlinear deconvolution method developed for SLIM is described in Haldar et al., *Label free high-resolution imaging of live cells with deconvolved spatial light interference microscopy, Int. Conf. of the IEEE Eng. in Medicine and Biology Society,* pp. 3382-85 (2010), hereinafter, "Haldar (2010)", which is incorporated herein by reference. Haldar (2010) estimates the unknown magnitude and phase fields via a combination of variable projection and quadratic regularization applied to the phase component. The method of Haldar (2010), however, fails to exploit the sparsity information of biological specimen because the quadratic regularization employed implicitly enforces smoothness on the unknown phase field, even though the phase field is typically not smooth at object boundaries such as fine-scale cell boundaries and intracellular structures. Haldar (2010), moreover, uses a nonlinear conjugate gradient method to obtain both phase and magnitude, which generally contains several approximations and heuristics, and is therefore not as well characterized as linear methods in terms of stability and convergence.

Gazit et al., *Super-resolution and reconstruction of sparse sub-wavelength images, Opt. Exp.,* 17, pp. 23920-46 (2009), hereinafter, "Gazit (2009)", which is incorporated herein by reference, employed compressed sensing principles to demonstrate resolution increase, in synthetic images, up to five time higher than an artificially imposed resolution limit. The analysis of Gazit (2009) imposes a constraint of exact sparsity in some domain. That is, when represented in a basis, most of the image does not contribute to the measured light energy except only at a few locations. The user is constrained to choosing the support of the non-zero coefficients within this basis, and several thresholds.

SUMMARY OF CERTAIN EMBODIMENTS OF THE INVENTION

In accordance with preferred embodiments of the present invention, a method is provided for deriving a quantitative phase contrast image of a physical specimen. The method has steps of:
 a. illuminating the specimen with a beam characterized by a focus through a condenser annulus that introduces a phase delay that is an integral multiple of $\pi/2$;
 b. temporally modulating at least one of the phase and amplitude of the spatial frequency components of the spatially transformed image to obtain interferograms at a plurality of relative phase offsets;
 c. deriving a quantitative phase image of the specimen based on the interferograms;
 d. casting the quantitative phase image in terms of a sparse image model;
 e. calculating a deconvolved complex image by iteratively maximizing a posterior probability distribution; and
 f. displaying the deconvolved complex image.

In accordance with alternate embodiments, there may also be a step of setting a constant field magnitude prior to casting the quantitate phase image in terms of a sparse image model. At least one linear transform may be applied to the quantitative phase image as a high-pass filter, where the linear transform may include a directional contourlet, for example.

In other embodiments of the invention, signal-independent noise may be modeled via an independent Gaussian noise model with a single parameter. The step of calculating a deconvolved complex image may include incorporating a regularization term into the posterior portability distribution, and may entail a linear maximization problem.

In yet further embodiments of the invention, the step of illuminating may further comprise scanning the focus to a plurality of depths within the specimen. The step of calculating a deconvolved complex image may include deconvolving the quantitative phase image to obtain a three-dimensional phase representation of the specimen at each of a plurality of distances relative to a fiducial plane. A plurality of linear transforms may then be applied on all planes of the quantitative phase image.

In accordance with further alternate embodiments of the invention, a computer program product is provided for use on a computer system for deriving a quantitative phase contrast image of a physical specimen. The computer program product has a computer usable tangible medium with computer readable program code that includes:
 a. program code for inputting interferograms obtained by illumination of a specimen at a plurality of relative phase offsets;
 b. program code for deriving a quantitative phase image of the specimen based on the interferograms;
 c. program code for casting the quantitative phase image in terms of a sparse image model; and
 d. program code for calculating a deconvolved complex image by iteratively maximizing a posterior probability distribution.

DESCRIPTION OF THE FIGURES

The foregoing features of the invention will be more readily understood by reference to the following detailed description, taken with reference to the accompanying drawings, in which:

FIG. 3A depicts an experimental point spread function (PSF), while

FIG. 4A shows a SLIM image in which two very closely located particles from a sub-region of an image of a hippocampal neuron are not resolved, while

DESCRIPTION OF SPECIFIC EMBODIMENTS OF THE INVENTION

Definitions. As used in this description and the accompanying claims, the following term(s) shall have the meaning indicated, unless the context otherwise requires:

The term "image" as used herein and in any appended claims, shall mean any multidimensional representation, whether in tangible or otherwise perceptible form or otherwise, whereby a value of some characteristic is associated with each of a plurality of locations corresponding to dimensional coordinates of an object in physical space, though not necessarily mapped one-to-one thereonto. Thus, for example, the graphic display of the spatial distribution of some feature, such as intensity, or phase, constitutes an image. So, also, does an array of numbers in a computer memory or holographic medium. Similarly, "imaging" refers to the rendering of a stated physical characteristic in terms of one or more images.

In accordance with embodiments of the present invention, methods are taught for complex field deconvolution using an image model suitable for characterizing fine-scale structures. These methods may be referred to herein as "dSLIM." Based on the prominent features of phase images, the underlying image uses the sparsity properties of the transform coefficients. This model is especially useful in capturing fine-scale structures, and it successfully reveals details in the phase components that would otherwise be lost due to the instrument optical transfer function.

In addition, due to the very low noise floor provided by SLIM (for example, 0.3 nm spatially and 0.03 nm temporally, in the system described by Wang (2011a)), accurate experimental estimates of the point spread function can be obtained, and deconvolution artifacts are significantly reduced. Resolution improvements by a factor of 2.3 have been achieved with dSLIM. Thus, in dSLIM, images with a final resolution of 238 nm can be rendered with an objective of numerical aperture (NA) of only 0.65. Moreover, the methods described below in accordance with embodiments of the present invention are very flexible in incorporating image properties in a wide range of applications (such as materials imaging) and may also be utilized advantageously for other interference microscopy techniques.

In the present application, first, an overview of SLIM is provided. The image degradation model and the general framework for complex deconvolution are then presented. A deconvolution algorithm is presented, and, finally, experiments with SLIM images are described.

The following notation is employed herein: Bold letters h and H denote vectors and matrices, respectively, with transposes $h^T$ and $H^T$. The spatial coordinates within a image are denoted by (x,y), operator * denotes convolution, and i is equal to $\sqrt{-1}$. Finally, $\{\cdot\}$ is used to denote a set created with its argument.

Overview of Spatial Light Interference Microscopy (SLIM)

In SLIM, a spatially coherent light source, $U(x,y)=|U(x,y)|\exp[i\Phi(x,y)]$, is used for illumination, and the illuminating light is decomposed into scattered and unscattered fields after passing the specimen. The unscattered light is denoted as $U_0$ and the scattered light as $U_1(x,y)$. A liquid crystal phase modulator (LCPM) is used to introduce phase modulations into the unscattered field, such that $$U_0=|U_0|\exp[-i\phi_0], \quad (1)$$

$$U_1(x,y)=|U_1(x,y)|\exp[i\phi_1(x,y)], \quad (2)$$

where $\phi_0$ is the intentionally added phase delay, and $\phi_1(x,y)$ is the phase difference between the scattered and unscattered fields caused by the specimen. The unscattered field contains the uniform background of the image field, whereas the scattered light provides information on the structure of the specimen. The specimen may be any physical object, however techniques in accordance of the present invention are particularly advantageously suited to biological specimens that are substantially transparent, and thus not amenable to imaging using ordinary intensity imaging techniques, with the application of stains or fluorescent markers.

The recorded intensity may be expressed as $$I(x,y,\phi_0)=|U_0|^2+|U_1(x,y)|^2+2|U_0||U_1(x,y)|\cos(\phi_1(x,y)+\phi_0). \quad (3)$$

In traditional phase-contrast microscopy, $\phi_0$ is fixed at $$\frac{\pi}{2}$$

and a single image is acquired. This can only provide qualitative information (i.e., $\phi_1(x,y)$ cannot be uniquely retrieved). In contrast, SLIM uses multiple phase delays 0, $$\frac{\pi}{2},$$

$\pi$, and $$\frac{3\pi}{2},$$

such that $\phi_1$ can be uniquely determined. Specifically, $\phi_1$ can be extracted from the four recordings using $$\phi_1(x,y) = \arctan\left[\frac{I\left(x,y,-\frac{\pi}{2}\right) - I\left(x,y,\frac{\pi}{2}\right)}{I(x,y,0) - I(x,y,\pi)}\right]. \quad (4)$$

Moreover, the phase associated with the complex field can be calculated by $$\Phi(x,y) = \arctan\left[\frac{m(x,y)\sin(\phi_1(x,y))}{1+m(x,y)\sin(\phi_1(x,y))}\right], \quad (5)$$

when $$m(x,y) = \frac{|U_1(x,y)|}{|U_0|}$$

is the ratio of magnitudes of the scattered and unscattered light.

Image Formation and Deconvolution Model

The previous section has described how both the magnitude and phase of the complex image function $U(x,y)=|U(x,y)|\exp[i\Phi(x,y)]$ can be uniquely determined using SLIM (using Eqns. (3) and (5)). However, as in all imaging systems, only a degraded version of this field can be observed in practice. Modeling the imaging process as a linear, spatially invariant degradation system, the measured image can be expressed as the convolution of the original complex field with the instrument point spread function (PSF) as $$\tilde{U}(x,y)=U(x,y)*h(x,y)+n(x,y), \quad (6)$$

where h(x,y) is the PSF of the system, and n(x,y) is the additive signal independent noise. In general, both the magnitude and phase of the complex image function is degraded via the optical transfer function. As taught by Sarder et al., Deconvolution methods for 3-d fluorescence microscopy images, IEEE Signal Process. Mag., 23, pp, 32-45 (2006), field magnitude and phase can be estimated using a regularized inverse formulation, $$\left|\hat{U}(x,y)\right|, \hat{\Phi}(x,y) = \underset{U(x,y),\Phi(x,y)}{\operatorname{argmin}} \frac{1}{2\sigma^2}\left\|\tilde{U}(x,y) - U(x,y)*h(x,y)\right\|^2 + \beta R(|U(x,y)|, \Phi(x,y)), \quad (7)$$

where $\sigma^2$ is the noise variance, and the functional $R(\cdot)$ is used to regularize and impose constraints on the estimates of the magnitude and phase.

The estimation of both magnitude and phase in Eqn. (7) is a nonlinear optimization problem that is highly ill-posed and hard to solve in practice. However, also in practice, the degradation in the magnitude is very small compared to the degradation in the phase, as pointed out in Cotte (2010). Moreover, the phase image contains most of the information of the specimen relevant and useful from an application point of view. Therefore, it is convenient and justified to assume that the magnitude of the field is constant, and that the imaging system introduces negligible distortion in the magnitude, such that $|\tilde{U}(x,y)|\approx|U(x,y)|=$const. This assumption makes the problem in Eqn. (7) linear, and it is also very useful in avoiding instabilities due to nonlinearity.

With the foregoing approximation, the problem (7) becomes $$\hat{\Phi}(x, y) = \underset{\Phi(x,y)}{\operatorname{argmin}} \frac{1}{2\sigma^2} \|\exp[i\hat{\Phi}(x, y)] - h(x, y) * \exp[i\Phi(x, y)]\|^2 + \beta R(\Phi(x, y)). \quad (8)$$

For mathematical convenience and clarity, g(x,y) is now used to denote the observed field exp [i$\hat{\Phi}$(x,y)], and f(x,y) is used to denote the unknown field exp [i$\Phi$(x,y)]. Due to the assumed linearity of the degradation, made, for the first time, in accordance with the present invention, the problem (8) can be expressed equivalently in matrix vector form as $$\hat{f} = \underset{f}{\operatorname{argmin}} \frac{1}{2\sigma^2} \|g - Hf\|^2 + \beta R(f), \quad (9)$$

where g and f are images g(x,y) and f(x,y) in vector forms, respectively, and H is the convolution matrix corresponding to the PSF h(x,y).

When no regularization is used in (9), the closed-form solution of $\hat{f}$ can be found as $(H^T H)^{-1} H^T g$ (equivalent to the inverse filter). However, this approach generally leads to noise amplification and ringing artifacts due to heavy suppression of high spatial frequencies. The role of regularization is to impose desired characteristics on the image estimates to avoid this noise amplification and to increase the resolution. The parameter $\beta$ is used to control the trade-off between the data-fidelity and the smoothness of the estimates.

Complex Field Deconvolution using Sparsity
Image Model

It is well-known that phase-contrast imaging is highly sensitive to object boundaries but relatively insensitive to the flat background areas. Due to this characteristic, phase images exhibit high contrast around edges and local spatial variations within the specimen, which allows the capture of accurate shape and edge information. Moreover, in many important applications where interference microscopy is utilized, e.g., live cell imaging, the specimen contains very fine structures and small-scale movements that need to be precisely localized.

Based on these observations, a model of phase images is constructed, in accordance with embodiments of the present invention, that accurately represents this fine structure with sharp boundaries. The modeling is based on the sparsity principle, namely, that the phase images can be very accurately represented in some transform domain with sparse coefficients. Whereas the enforcement of sparsity directly on an intensity image, as by Gazit (2009), is appropriate in the context of point-like structures, its application in accordance with the present invention can model a wide range of structures. This transform sparsity can be achieved by appropriately selecting the transforms that capture the characteristics of spatial variations within the image, as now described.

Figure 1A:
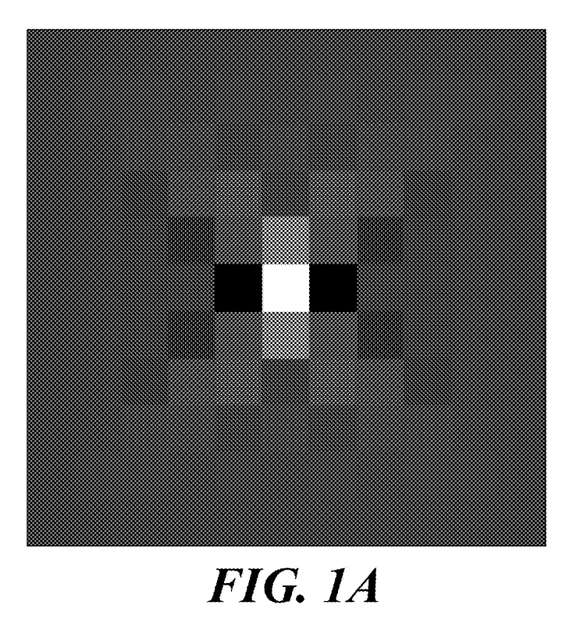
FIGS. 1A and 1B depict contour lets in horizontal and vertical directions, respectively, as applied in accordance with embodiments of the present invention.
Figure 1B:
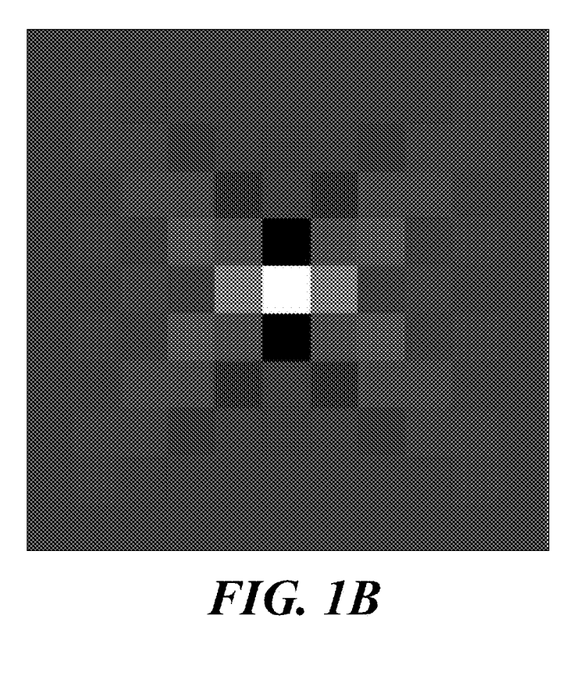
Figure 2:
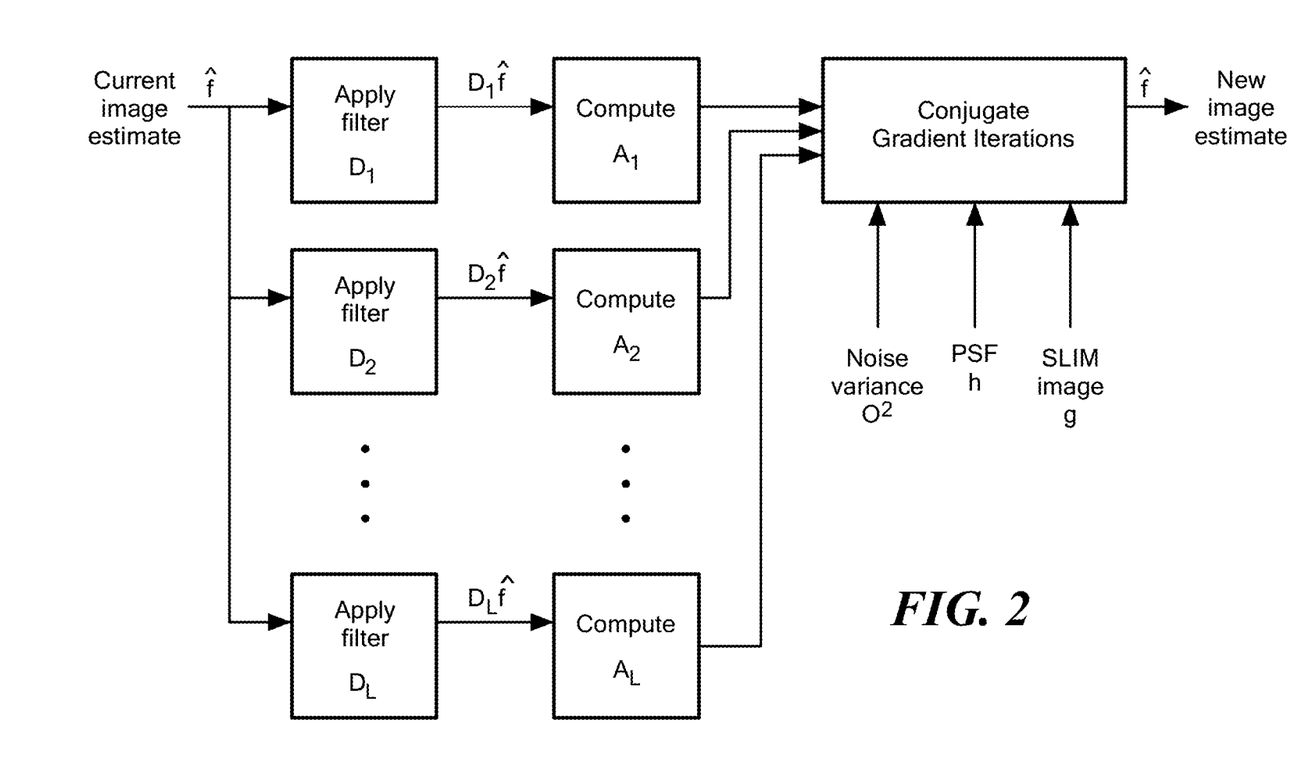
FIG. 2 is a flowchart depicting the steps involved in deconvolution of a SLIM image in accordance with an embodiment of the present invention.

A set of L linear transforms $D_k$ of the complex image f, with k=1, ..., L, is now considered. These transforms are chosen to be high-pass filters, such that their application provide complex images with a large number of coefficients with small values, while only a few coefficients contain most of the signal energy. The selection of the linear transforms that most accurately capture the image characteristics is crucial in the final image quality. A collection of difference operators is employed to capture signal variation at varying scales. Directional contourlets, as described by Cunha et al., *The nonsubsampled contoulet transform: Theory, design and applications*, Int. Conf. of the IEEE Trans. Imag. Process., 15, 30893101 (2006), incorporated herein by reference, is depicted in Fig. and is used to capture the overall spatial variation, as the directional contourlets contain both vertical/horizontal and diagonal directions. In addition, for smaller scale features, first order directional difference operators are included, $$[-1\ 1], [-1\ 1]^T, \quad (10)$$

and also 45° and −45° first-order derivative filters $$\begin{bmatrix} -1 & 0 \\ 0 & 1 \end{bmatrix}, \begin{bmatrix} 0 & -1 \\ 1 & 0 \end{bmatrix}. \quad (11)$$

More complicated transforms may also be incorporated in a straightforward manner within the scope of the present invention, in some cases, at the expense of added computational complexity.

Using these transforms, an image model is constructed to exploit the sparsity in the transform coefficients. One sparse image model that may be employed, within the scope of the present invention, is:

$$p(f \mid \{\alpha_k\}) \propto \exp\left(-\frac{1}{2}\sum_{k=1}^{L} \alpha_k \|D_k f\|_p^p\right), \quad (12)$$

where $\|\cdot\|_p^p$ denotes the $l_p$-pseudonorm, and $\alpha_k$ are the weighting coefficients. Other priors may also be employed within the scope of the present invention, such as described by Bruckstein et al., *From sparse solutions of systems of equations to sparse modeling of signals and images*, SIAM Review, 51, pp. 34-81 (2009), incorporated herein by reference. It is known that using 0<p≤1 enforces sparsity on $D_k f$, with smaller p values increasing the sparsity effect. Hence, the prior in Eqn. (12) enforces sparsity in the transform coefficients $D_k f$, which in turn leads to smoothness in the image estimate.

A disadvantage of the prior in Eqn. (12) is its nonconvexity, resulting in a high number of local minima when estimating f. Preferably, separate Gaussian priors are used for each transform coefficient $$p(f \mid \{A_k\}) \propto \exp\left(-\frac{1}{2}\sum_{k=1}^{L}\sum_{i=1}^{N} \alpha_{ki} \|(D_k f)_i\|_2^2\right), \quad (13)$$

or, in a more compact form, $$p(f \mid \{A_k\}) \propto \exp\left(-\frac{1}{2}\sum_{k=1}^{L} (D_k f)^T A_k (D_k f)\right), \quad (14)$$

where $A_k$ are diagonal matrices with $\alpha_{ki}$, i=1, ... N in the diagonal. Compared to Eqn. (12), where a single parameter is assigned to all coefficients of $k^{th}$ filter output, separate parameters are used for each coefficient. Since Eqn. (14) is equivalent to Eqn. (12) in the limit p→0, as shown by Babacan et al., *Sparse Bayesian Image Restoration*, IEEE International Conference on Image Processing (ICIP 2010), (2010), incorporated herein by reference, it highly enforces sparsity. The model of Eqn. (14) has the advantage of being convex (as opposed to Eqn. (12)), and therefore optimization over Eqn. (14) is much easier and more robust compared to minimization.

The parameters $\alpha_{ki}$ play a special, important role in Eqn. (13): they represent the local spatial activity at each location, and hence they are a measure of spatial variation in the corresponding filter direction. It is clear that the model of Eqn. (14) requires a large number of parameters, whose manual selection is not practical. They may be estimated simultaneously, however, with the complex image. For their estimation, we employ an additional level of model and assign uniform priors $$p(\alpha_{ki}) = \text{const}, \forall k, i. \tag{15}$$

Thus, in assigning equal probability to all possible values of $\alpha_{ki}$, no prior knowledge is assumed with respect to its value.

It should be emphasized that this modeling based on sparsity principles does not necessarily cause the estimates to have very sparse coefficients. Real images are generally only approximately sparse, i.e., a few transform coefficients have large values whereas most coefficients are very small, but not necessarily exactly zero, a behavior generally referred to as "compressible." Enforcing sparsity to an extreme extent can therefore suppress subtle image features, which may be important. Modeling in accordance with the preferred embodiment of Eqn. (14), on the other hand, allows for the small-valued transform coefficients through Gaussian distributions while enforcing the general compressible structure of the images.

Noise Model

In preferred embodiments of the invention, signal-independent noise is modeled via a independent Gaussian noise model on the observed field as $$p(g \mid f, \sigma^2) \propto \exp\left(-\frac{1}{2\sigma^2}\|g - Hf\|_2^2\right), \tag{16}$$

with $\sigma^2$ the noise variance. An additional level of modeling (as in Eqn. (15)) can be incorporated to estimate this parameter as well. However, SLIM provides images with very high signal-to-noise rations (SNRs), often on the order of 1000 or more, and therefore $\sigma^2$ is generally very small and can be estimated experimentally from an uniform area of the observed image. In addition, the Gaussian noise assumption becomes an accurate description of the noise in SLIM due to the high SNR.

Estimation of the Complex Field

Using the modeling described in the previous sections, the unknown complex image f and the parameters $\alpha_{ki}$ may be derived using maximum a posteriori (MAP) estimates, that is, $$\hat{f}, \hat{\alpha}_{ki} = \underset{f, \alpha_{ki}}{\text{argmin}} - \log\left[p(g \mid f, \sigma^2) p(f \mid \{A_k\}) \prod_{k=1}^{L} \prod_{i=1}^{N} p(\alpha_{ki})\right] \tag{17}$$

-continued $$= \underset{f, \alpha_{ki}}{\text{argmin}} \frac{1}{\sigma^2}\|g - Hf\|_2^2 + \sum_{k=1}^{L}(D_k f)^T A_k (D_k f). \tag{18}$$

This problem is convex in f and $\alpha_{ki}$, but not jointly, and, therefore, an iterative scheme may be employed to estimate the unknowns in an alternating fashion. The optimal estimate of the complex image can be found by taking the derivative of Eqn. (18) and setting it equal to zero, which results in $$\hat{f} = \left(H^T H + \sigma^2 \sum_{k=1}^{L} D_k^T A_k D_k\right)^{-1} H^T g. \tag{19}$$

The parameters $\alpha_{ki}$ can be estimated in a similar way by equating the corresponding derivatives to zero, which results in $$\hat{\alpha}_{ki} = \frac{1}{\left(D_k \hat{f}\right)_i^2 + \varepsilon}, \tag{20}$$

where $\varepsilon$ is a small number (e.g., $10^{-6}$) used to avoid numerical instability. It follows from Eqn. (20) that the parameters $\alpha_{ki}$ are functions of the $k^{th}$ filter response at pixel i, and therefore a spatially-adaptive estimation is employed for f in Eqn. (19) through their joint estimation. It may be noted that matrices $A_k$ are spatial-adaptivity matrices controlling the smoothness applied at each location; when the filter responses at a pixel are very small, the algorithm assumes that the pixel has low spatial variation, and applies a large amount of smoothness at that point. On the other hand, if the filter responses are high, the pixel is likely to be close to an edge and the smoothness amount is lowered to preserve the image structure.

Figure 5:
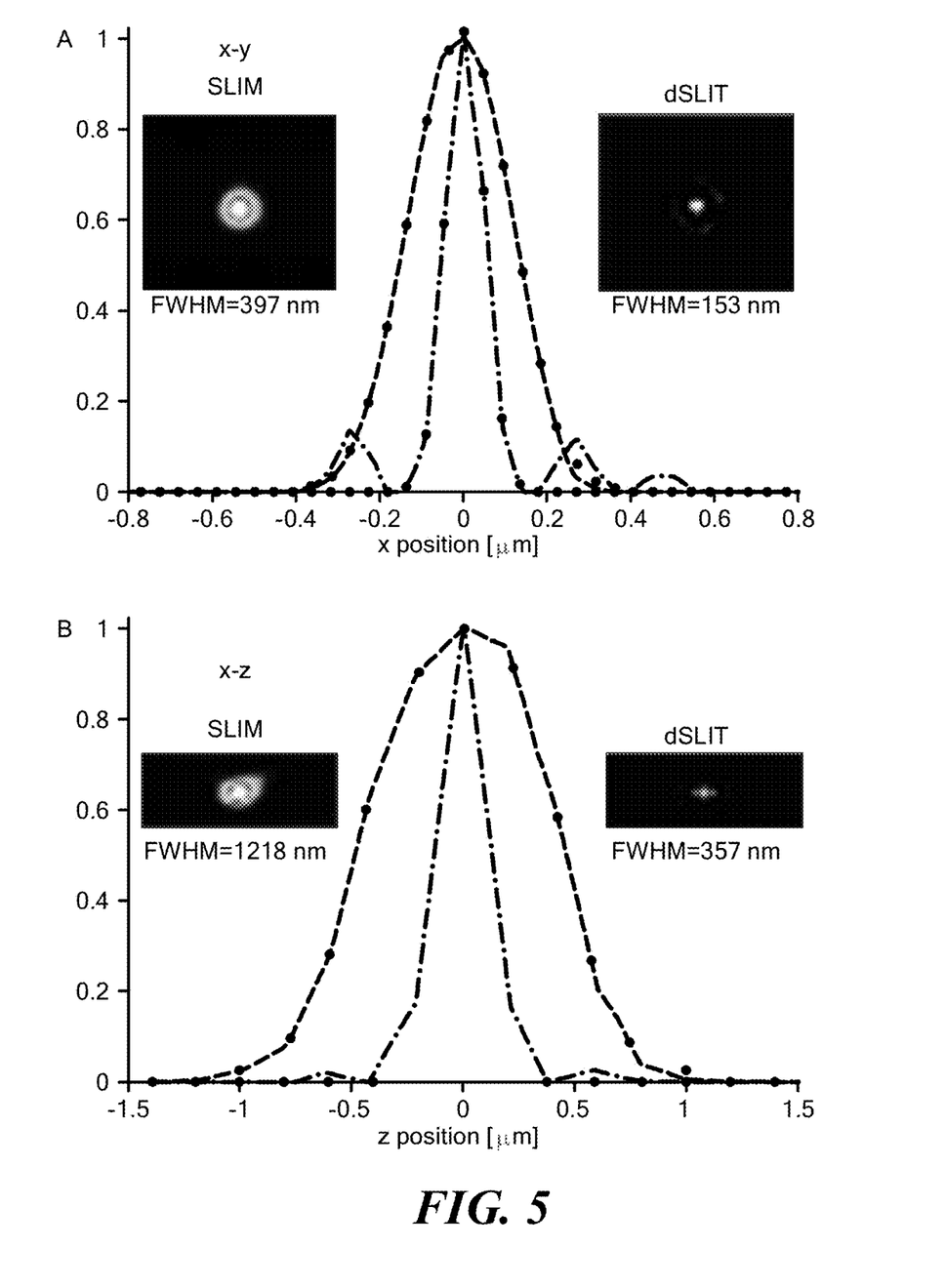
FIG. 5A shows a comparison of a three dimensional point spread function, raw and deconvolved, in the x-y plane, revealing a reduction in full-width half-maximum (FWHM) from 397 nm to 153 nm.
FIG. 5B shows the comparison of FIG. 5A in the x-z plane, with a reduction in FWHM from 1218 nm to 357 nm. The dashed lines show the data and the circular markers indicate the Gaussian fit used to determine the FWHM.

Thus, methods of dSLIM in accordance with preferred embodiments of the invention consist of alternating estimations of the complex field f using Eqn. (19), and the spatial adaptivity matrices $A_k$ using Eqn. (20). The block diagram of a single dSLIM iteration is shown in FIG. 5. The filters $D_k$ consist of the derivative operators in Eqn. (10) and Eqn. (22), and the directional contourlets. The estimate of the image in Eqn. (19) can be computed very efficiently using the conjugate gradient (CG) method. The matrices H and $D_k$ do not have to be explicitly constructed during CG iterations; all operations in Eqn. (19) can be performed via convolutions in the spatial domain or multiplications in the Fourier domain. Empirically, it is found that the algorithm converges rapidly; a few iterations (up to 5-10) are generally enough to provide high-quality results. Hence, methods in accordance with the invention can be applied to large images very efficiently.

In the embodiment of the present invention described in detail above, only a single free parameter (the noise variance $\sigma^2$) needs to be set by the user. Its value may be empirically estimated by taking a rectangular region of the image with uniform values and computing the variance in this region. This estimate is known to be reliable in images with high SNR. Since this free parameter corresponds to a physical quantity, its estimation is relatively easy and does not require extensive image-dependent tuning.

dSLIM does not alter the quantitative imaging property of SLIM, which is one of its main advantages. As the deconvolution is applied to the complex field exp [i$\Phi$(x,y)] rather than to the measured intensities I(x,y,$\phi_0$) in Eqn. (3), the quantitative phase information is preserved. In contrast, traditional deconvolution methods that are applied directly to intensity images can not preserve the quantitative information.

In a 3D tomographic context, deconvolution in accordance with embodiments of the present invention is referred to as "dSLIT." First and second order direction difference operators, $$[-1\ 1],\ [-1\ 2\ -1], \quad (21)$$

and also 45° and −45° first-order derivative filters $$\begin{bmatrix} -1 & 0 \\ 0 & 1 \end{bmatrix}, \begin{bmatrix} 0 & -1 \\ 1 & 0 \end{bmatrix}. \quad (22)$$

are applied on all planes of the image, which is to say, on x-y, y-z, and x-z planes, giving, in total, 12 transforms to capture the local spatial variations with the 3D shape of structures within the image. Again, more complicated transforms may also be incorporated within the scope of the present invention.

Separate Gaussian priors are employed on each transform coefficient, as in the 2D case described above, and the problem of estimating the unknown complex image f, and the weights $\alpha_{k,i}$, is formulated with a maximum a posteriori (MAP) estimation framework as described above. Insofar as 3D deconvolution is also applied directly in the complex image domain, dSLIT does not alter the quantitative imagining properties of SLIM. In contrast, traditional deconvolution applied on intensity images cannot preserve quantitative information.

EXAMPLES

Figure 3A:
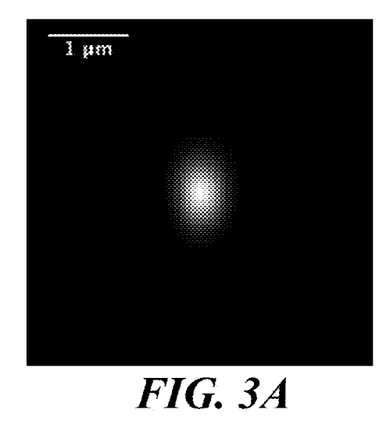

Application of dSLIM to complex field images obtained by SLIM quantitatively demonstrated the increase in resolution relative to undeconvolved images. All SLIM images were acquired using a white-light source (mean wavelength $\lambda$=530 nm); the field of view is 75 μm×100 μm with CCD resolution of 1040×1388. In all reported experiments, the specimen is relatively thin such that the whole image is in focus, and the degradation in the image is only due to a planar PSF. The PSF, depicted in Fig. (a), is obtained experimentally by imaging a sub-resolution 200 nm microbead treated as a point-source. Due to the high SNR provided by SLIM, this PSF closely matches the actual optical transfer function of the imager.

In all images obtained, the noise level was estimated within the range $10^{-7}$-$10^{-6}$ (for a maximum signal value of 1), which is used as the value of the parameter $\sigma^2$. The NAs of the objective and condenser are $NA_o$=0.75 and $NA_c$=0.55, respectively.

The experimentally measured full-width-at-half-maximum (FWHM) of the PSF is 540 nm, which is comparable with the expected Rayleigh limit, calculated as $$\frac{1.22\lambda}{NA_o + NA_c} = 497\ nm.$$

Figure 3B:
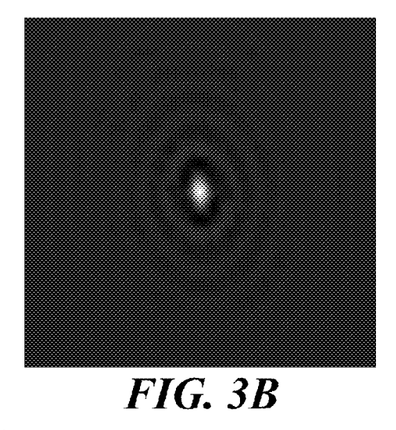
FIG. 3B shows, on the same scale, a result of dSLIM deconvolution of the image of FIG. 3A using techniques in accordance with an embodiment of the present invention.
Figure 3C:
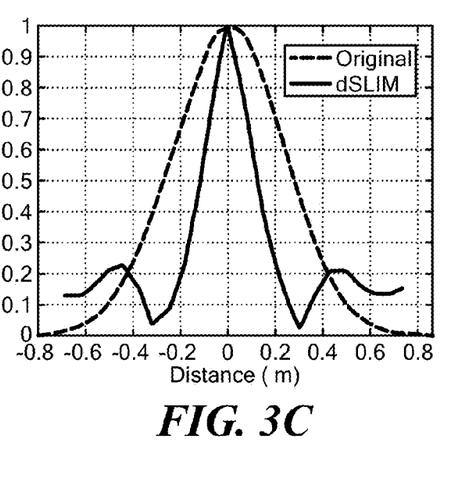
FIG. 3C compares normalized horizontal cross-sections of an image of a point source, with and without application of dSLIM in accordance with an embodiment of the present invention.
Figure 3D:
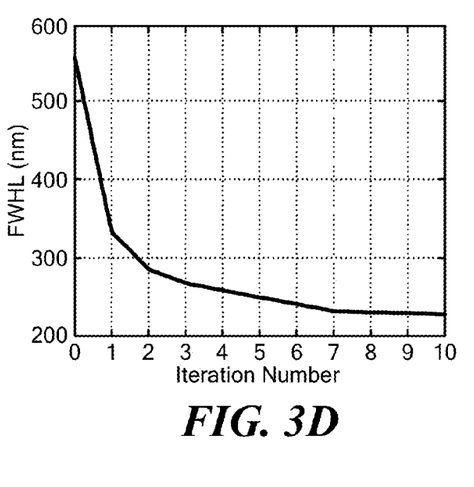
FIG. 3D plots estimated FWHMs during the iterative procedure, as a function of number of iterations, in accordance with an embodiment of the present invention.

A first experiment investigated the resolution increase obtained by dSLIM by applying it to the experimental PSF. The experimental PSF is shown in FIG. 3A. Treating this as the original image, dSLIM was applied and the result shown in FIG. 3B was obtained. The FWHM of the original PSF is approximately 540 nm, whereas after dSLIM, the FWHM is reduced to approximately 238 nm, corresponding to a 2.3 times increase in resolution. The horizontal cross-section of the images are shown in FIG. 3C, where the reduction in FWHM is clearly visible. Notice that this resolution is significantly below the diffraction limit. The estimated FWHM during the iterative procedure is shown in FIG. 3D, which shows a significant reduction in the first iterations and convergence within 10 iterations.

Figure 4A:
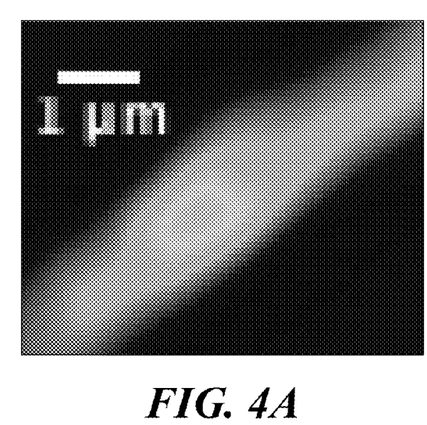
Figure 4B:
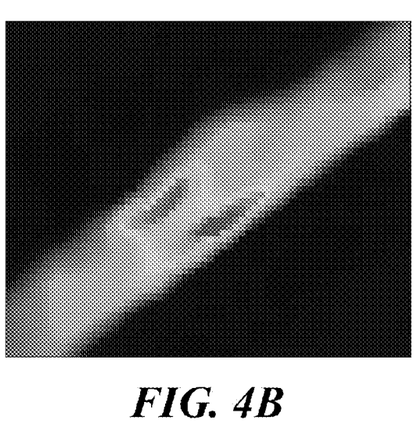
FIG. 4B shows a dSLIM image of the same sub-region.
Figure 4C:
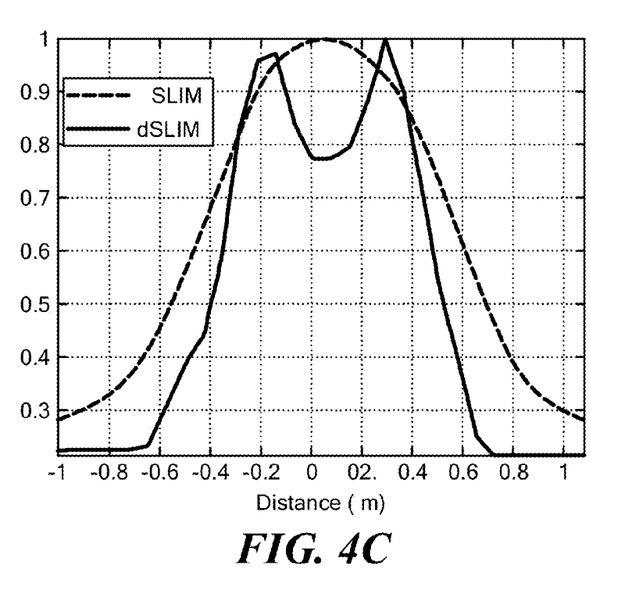
FIG. 4C shows normalized cross-sections through the maximum phase values of the sub-region of FIG. 4B.

Next, dSLIM imaging of a biological specimen was demonstrated. A SLIM phase image of a hippocampal neuron was produced. FIGS. 4A and 4B show detailed images of a single particle from the SLIM and dSLIM images. The cross-sections of the images are shown in FIG. 4C. The vertical diameter of the particle is measured as approximately 1.5 μm in the SLIM image, whereas it is measured as 0.63 μm in the dSLIM image. The reduction in the length of the particle is approximately 2.3, which is in agreement with the result of the PSF deconvolution experiment of FIGS. 3A-3D.

In a three-dimensional context, dSLIT was applied to imaging of subcellular structures in *E. coli* cells. The quantitative increase in resolution is depicted in FIG. 5A, in the transverse x-y plane, and in FIG. 5B, in a slice taken in the x-z plane, where z is the direction along the incident illumination beam. With the point spread functions shown in the insets, reductions in FWHM from 397 nm to 153 nm in the transverse x-y plane, and from 1218 nm to 357 nm in the x-z plane, are evidenced.

The efficacy of the novel methods described herein in accordance with the present invention arises from three key observations: First, image formation can be treated as a linear process in the complex fields, such that the degradation of the microscopy can be modeled by a PSF acting on the complex images. Second, due to the high SNR provided by the SLIM, the experimentally obtained PSF of the imager closely matches the actual PSF. Finally, the phase images of biological specimen can be very accurately modeled using sparsity principles. These properties provide for a very effective deconvolution procedure that significantly improves the final resolution of SLIM and SLIT imaging, advantageously allowing for the imaging of very fine structures and motions in live cells below the diffraction limit Due to the high spatial and temporal resolution, this approach can be utilized to acquire new information for studying live cells.

The present invention may be embodied in any number of instrument modalities. In alternative embodiments, the disclosed methods may be implemented as a computer program product for use with a computer system. Such implementations may include a series of computer instructions fixed, in a non-transitory way, either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product). These and other variations and modifications are within the scope of the present invention as defined in any appended claims.

We claim:

1. A method for deriving a quantitative phase contrast image of a physical specimen, the method comprising:
   a. illuminating the specimen with a beam characterized by a focus through a condenser annulus that introduces a phase delay that is an integral multiple of $\pi/2$;
   b. temporally modulating at least one of the phase and amplitude of the spatial frequency components of the spatially transformed image to obtain interferograms at a plurality of relative phase offsets;
   c. deriving a quantitative phase image of the specimen based on the interferograms, the image associating an intensity and a phase with each location in a field of view;
   d. casting the quantitative phase image in terms of a sparse image model;
   e. calculating a phase-preserving deconvolved complex image, deconvolved, in the sparse image model, with respect to an optical system degradation by iteratively maximizing a posterior probability distribution separately with respect to a complex field $e^{[i\Phi(x,y)]}$; and
   f. displaying the phase-preserving deconvolved complex image.

2. A method in accordance with claim 1, further comprising a step of setting a constant field magnitude prior to casting the quantitate phase image in terms of a sparse image model.

3. A method in accordance with claim 2, wherein the at least one linear transform includes a directional contourlet.

4. A method in accordance with claim 2, further comprising modeling signal-independent noise via an independent Gaussian noise model with a single parameter.

5. A method in accordance with claim 2, wherein the step of calculating a deconvolved complex image includes incorporating a regularization term into the posterior portability distribution.

6. A method in accordance with claim 2, wherein the step of calculating a deconvolved complex image entails a linear maximization problem.

7. A method in accordance with claim 1, further comprising applying at least one linear transform as a high-pass filter to the quantitative phase image.

8. A method in accordance with claim 1, wherein the step of illuminating further comprises scanning the focus to a plurality of depths within the specimen.

9. A method in accordance with claim 8, wherein the step of calculating a deconvolved complex image includes deconvolving the quantitative phase image to obtain a three-dimensional phase representation of the specimen at each of a plurality of distances relative to a fiducial plane.

10. A method in accordance with claim 8, further comprising applying a plurality of linear transforms on all planes of the quantitative phase image.

11. A computer program product for use on a computer system for deriving a quantitative phase contrast image of a physical specimen, the computer program product comprising a computer usable tangible medium having computer readable program code fixed thereon, the computer readable program code including:
   a. program code for inputting interferograms obtained by illumination of a specimen at a plurality of relative phase offsets;
   b. program code for deriving a quantitative phase image of the specimen based on the interferograms;
   c. program code for casting the quantitative phase image in terms of a sparse image model; and
   d. program code for calculating a deconvolved complex image preserving quantitative phase information of the quantitative phase image, deconvolved, in the sparse image model, with respect to an optical system degradation, by iteratively maximizing a posterior probability distribution separately with respect to a complex field $e^{[i\Phi(x,y)]}$.

* * * * *